(12) United States Patent
D'Hersignerie et al.

(10) Patent No.: US 12,716,489 B2
(45) Date of Patent: Aug. 25, 2026

(54) OPEN HYDRAULIC ASSISTANCE SYSTEM

(71) Applicant: Poclain Hydraulics Industrie, Verberie (FR)

(72) Inventors: Cyrille D'Hersignerie, Verberie (FR); Loris Taxil, Verberie (FR); Christophe Patte, Verberie (FR)

(73) Assignee: Poclain Hydraulics Industrie, Verberie (FR)

( * ) Notice: Subject to any disclaimer, the term of this patent is extended or adjusted under 35 U.S.C. 154(b) by 379 days.

(21) Appl. No.: 17/785,380

(22) PCT Filed: Dec. 7, 2020

(86) PCT No.: PCT/FR2020/052320
§ 371 (c)(1),
(2) Date: Jun. 14, 2022

(87) PCT Pub. No.: WO2021/123560
PCT Pub. Date: Jun. 24, 2021

(65) Prior Publication Data
US 2023/0027957 A1 Jan. 26, 2023

(30) Foreign Application Priority Data
Dec. 20, 2019 (FR) ...................................... 1915123

(51) Int. Cl.
*F16H 61/4148* (2010.01)
*B60K 7/00* (2006.01)
(Continued)

(52) U.S. Cl.
CPC ....... *F16H 61/4148* (2013.01); *B60K 7/0015* (2013.01); *B60K 17/10* (2013.01);
(Continued)

(58) Field of Classification Search
CPC ............. F16H 61/4148; F16H 61/4069; F16H 61/4061
See application file for complete search history.

(56) References Cited

U.S. PATENT DOCUMENTS 3,438,201 A * 4/1969 Nash .................... F16H 61/444 60/911
3,900,075 A 8/1975 Chichester et al.
(Continued)

FOREIGN PATENT DOCUMENTS

CN 204113777 U 1/2015
CN 106168288 A 11/2016
(Continued)

OTHER PUBLICATIONS

Parker Hannifin presentation "Hydraulic Pump Basics" (Year: 2005).*
(Continued)

*Primary Examiner* — Michael Quandt
(74) *Attorney, Agent, or Firm* — Lippes Mathias LLP

(57) ABSTRACT

A vehicle drive assistance system equipped with an open hydraulic circuit has a hydraulic pump, a hydraulic motor and a reservoir. The system has a three-position valve suitable for: in a first position, supplying the hydraulic motor in a first direction of operation; in a second position, fluidly isolating the hydraulic motor from the hydraulic pump and connecting the hydraulic motor to the reservoir; and in a third position, supplying the hydraulic motor in a second direction of operation. A flow controller is positioned between the hydraulic pump and the three-position valve. The flow controller is configured in such a way as to selectively allow or not allow the passage of fluid through the supply duct of the hydraulic pump toward the three-position valve.

13 Claims, 3 Drawing Sheets

(51) Int. Cl.

| | |
|---|---|
| ***B60K 17/10*** | (2006.01) |
| ***F16H 61/4035*** | (2010.01) |
| ***F16H 61/4061*** | (2010.01) |
| ***F16H 61/44*** | (2006.01) |

(52) U.S. Cl.
CPC ..... *F16H 61/4035* (2013.01); *F16H 61/4061* (2013.01); *F16H 61/44* (2013.01)

(56) References Cited

U.S. PATENT DOCUMENTS

| | | | | |
|---|---|---|---|---|
| 3,997,017 | A * | 12/1976 | Campbell | F16H 61/44<br>180/243 |
| 9,188,004 | B2 * | 11/2015 | Prigent | F16H 61/4035 |
| 9,410,558 | B2 * | 8/2016 | Heren | F16H 61/4148 |
| 11,358,664 | B2 * | 6/2022 | Erznoznik | F16H 61/4148 |
| 11,371,535 | B2 * | 6/2022 | Shimada | E02F 9/2285 |
| 2013/0000293 | A1 | 1/2013 | Dybing | |
| 2018/0135749 | A1 * | 5/2018 | Prigent | F16H 61/4148 |

FOREIGN PATENT DOCUMENTS

| | | | | |
|---|---|---|---|---|
| DE | 19746090 | A1 | 3/1999 | |
| FR | 3057843 | A1 | 4/2018 | |
| FR | 3057845 | A1 | 4/2018 | |
| FR | 3035829 | B1 | 9/2018 | |
| FR | 3057844 | B1 | 11/2019 | |
| GB | 1131750 | A * | 10/1968 | B62D 59/02 |
| WO | 2018077829 | A1 | 5/2018 | |

OTHER PUBLICATIONS

Parker Hannifin catalog "Axial Piston Pumps" Series PVplus—Design Series 47, variable displacement (Year: 2023).*

International Preliminary Report on Patentability and Written Opinion of International Application No. PCT/FR2020/052320 dated May 17, 2022 (and English Translation), 11 pages.

French Search Report of French Application Serial No. 1915123 dated Jul. 21, 2020, 2 pages.

International Search Report of International Application Serial No. PCT/FR2020/052320 dated Mar. 31, 2021 and English translation, 4 pages.

* cited by examiner

ECU
M
R
10
20
20A
20B
21A
21B
22A
22B
30
31
32
33
34
35
36
37
38
39
40
41
42
43
44
50
60
62
64

20
20A
21A
22A
20B
21B
22B
50
30
31
32
33
34
35
36
37
38
39
ECU
40
41
42
43
44
M
10
60
62
64
R

OPEN HYDRAULIC ASSISTANCE SYSTEM

BACKGROUND OF THE DISCLOSURE

This invention relates to the field of vehicle drive assistance circuits.

STATE OF THE ART

Systems are known for providing a vehicle assistance system with a hydraulic circuit of open type, i.e. wherein a hydraulic pump supplying the hydraulic circuit draws fluid, typically oil, from a reservoir, and wherein the oil discharge at the outlet of the hydraulic circuit is poured into the reservoir, unlike hydraulic circuits of closed type wherein the oil discharge returns to the intake of the hydraulic pump. Non-motor wheels of a vehicle, or wheels of a coupling or of a trailer can thus be selectively driven by the assistance system, for example for specific conditions for the overcoming of obstacles.

The documents FR 1554012, FR 1660328, FR 1660329 and FR 1660330 in the name of the applicant thus disclose different structures of assistance circuits.

These different circuits make use of an open-center valve, making it possible to optimize the sequence of disengagement of the assistance system. The hydraulic pump used in such circuits has a displacement that is variable as a function of the load. However, a recurring problem with such circuits relates to the disengagement of the assistance hydraulic motors, and particularly the retraction of the pistons into their respective cylinders when the hydraulic assistance is not in use. However, such a function requires the isolation of the hydraulic motors, either with an open- or closed-center valve.

Open-center valves do however have a disadvantage in that when the system is idle, i.e. when the hydraulic assistance is not in use, the hydraulic pump then delivers a flow in the reservoir, and will therefore increase its displacement such as to generate a pressure increase, without managing to do so. Conversely, in the case of a closed-center valve, the hydraulic pump will then reduce its displacement to a minimum when the system is idle, but it will then not allow for the retraction of the pistons of the hydraulic motors.

SUMMARY OF THE DISCLOSURE

This summary thus aims to at least partly respond to these problems, and makes provision for a vehicle drive assistance system equipped with an open hydraulic circuit comprising a hydraulic pump, a hydraulic motor and a reservoir, the hydraulic circuit comprising an intake duct connecting the reservoir to the hydraulic pump, a supply duct connecting the hydraulic pump to the hydraulic motor, and a return duct connecting the hydraulic motor to the reservoir, said system comprising a three-position valve connected to the supply duct and to the return duct, suitable for, in a first position supplying the hydraulic motor in a first direction of operation, in a second position fluidly isolating the hydraulic motor from the hydraulic pump and connecting the hydraulic motor to the reservoir, and in a third position supplying the hydraulic motor in a second direction of operation opposite to the first direction of operation, said system being characterized in that the hydraulic pump is a variable-displacement hydraulic pump, unidirectional, with displacement control slaved to a pressure setpoint, the system comprises a flow controller positioned on the supply duct, between the hydraulic pump and the three-position valve, said flow controller being configured in such a way as to, in a first configuration, prevent the passage of fluid through the supply duct of the hydraulic pump toward the three-position valve in such a way that the displacement of the hydraulic pump tends to zero or is null, and in a second configuration, allowing the passage of fluid through the supply duct of the hydraulic pump toward the three-position valve.

The hydraulic pump is typically of the type for open circuit, with variable displacement, unidirectional, with displacement control slaved to a pressure setpoint. Such a hydraulic pump is commonly referred to as a load-sensing pump.

The three-position valve is typically a five-way three-position directional control valve acting as a direction reverser.

According to an example, the three-position valve has:

- a first orifice connected to the hydraulic pump via the flow controller,
- a second orifice connected to the reservoir,
- a third orifice connected to a first orifice of the hydraulic motor,
- a fourth orifice connected to the reservoir, and
- a fifth orifice connected to a second orifice of the hydraulic motor, and wherein the second position connects the first orifice to the second orifice, and connects the third orifice to the fourth orifice and to the fifth orifice.

According to an example, the flow controller is a two-way two-position valve, having a first position wherein it allows the passage of fluid, and a second position which it takes up as default, wherein it prevents the passage of fluid from the hydraulic pump toward the three-position valve.

According to an example, the flow controller is a proportional valve.

According to an example, the flow controller is configured in such a way as to allow the passage of fluid when the three-position valve is positioned in its first position or in its third position.

According to an example, the hydraulic motor is a hydraulic motor with radial pistons and multi-lobe cam.

The hydraulic motor is typically a hydraulic motor with retractable pistons; the pistons of the hydraulic motor can be retracted into housings, in such a way as to reduce or eliminate the displacement of said hydraulic motor.

According to an example, the second orifice of the three-position valve is connected to the reservoir via a first return duct, the casing of the hydraulic motor is connected to the reservoir via a second return duct, said return ducts being equipped with check valves tared respectively at tare pressures P64 and P62 such that P64>P62, the first return duct and the second return duct being connected by a choke (60) upstream of said tared check valves.

According to an example, the system is configured in such a way as to provide a time delay between the shutoff of the control of the three-position valve and the shutoff of the control of the flow controller.

This disclosure also relates to a vehicle comprising an assistance system as defined previously.

This disclosure also relates to a method for controlling a system as defined previously, wherein to disengage the drive assistance, the three-position valve is toggled to its second position, then after executing a time delay, the flow controller is toggled in such a way that it prevents the passage of fluid from the hydraulic pump to the three-position valve.

The assistance system for which provision is made makes it possible to embody a drive system for the non-motor wheels of a vehicle, for example the wheels of a coupling or trailer, or load wheels, or load and guide wheels, or a lift axle, which can thus be selectively driven by the assistance system, for example for specific conditions or for the overcoming of obstacles. Non-motor wheels are wheels which are normally load wheels on the vehicle, and motor wheels are those which are normally driven by the mechanical transmission. The traction assistance is an additional system which is used either within a reduced range of speeds, or temporarily. The assistance is used alone, or alongside the mechanical transmission.

BRIEF DESCRIPTION OF THE DRAWINGS

The invention and its advantages will be better understood on reading the detailed description given hereinafter of different embodiments of the invention given by way of non-limiting example.

Common items on the figures bear identical reference numbers.

DETAILED DESCRIPTION OF THE PREFERRED EMBODIMENTS

Figure 1:
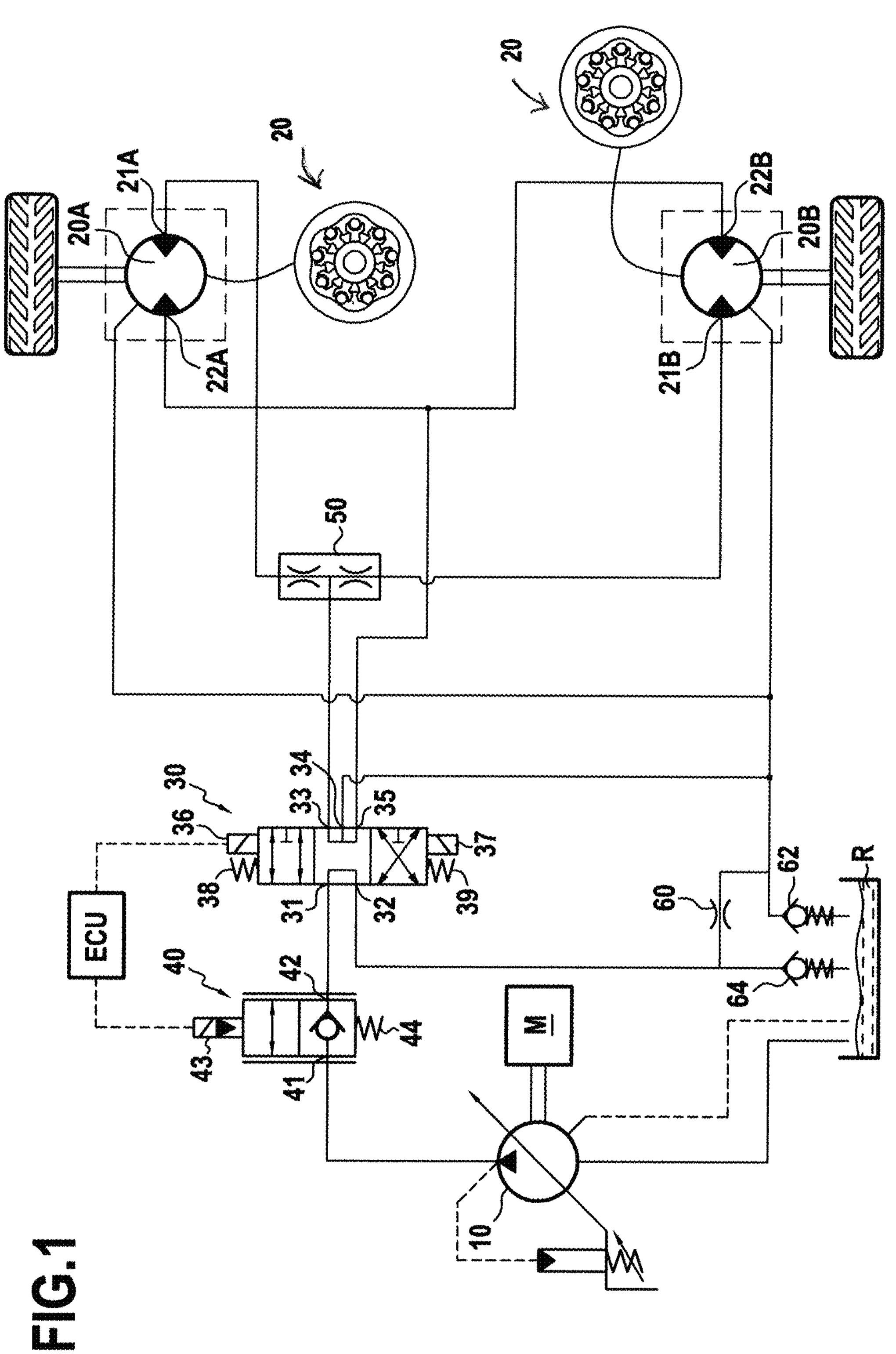
FIG. 1 schematically represents a hydraulic circuit according to an aspect of the invention in a configuration that will be classified as idle or disengaged.
Figure 2:
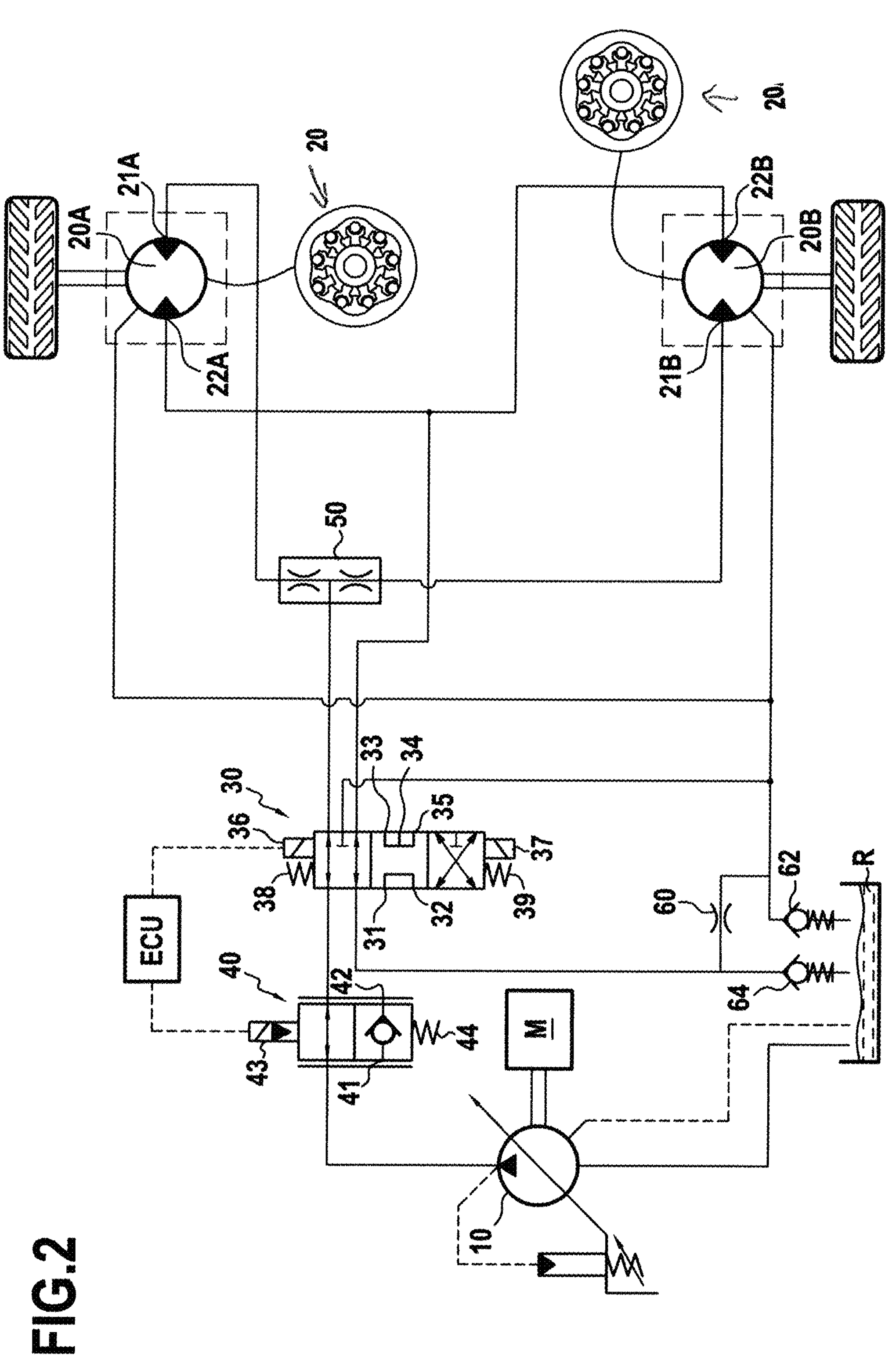
FIG. 2 shows the same circuit in an assistance configuration.

FIGS. 1 and 2 schematically show a hydraulic circuit according to an aspect of the invention in two configurations that will be detailed further on.

Figure 3:
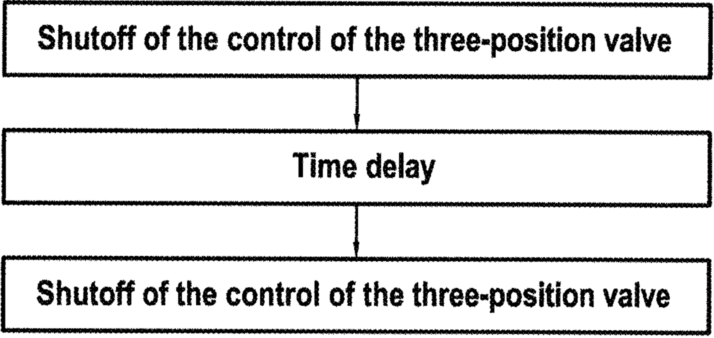
FIG. 3 is a flow diagram illustrating shutoff of the control of the three-position valve.
Figure 4:
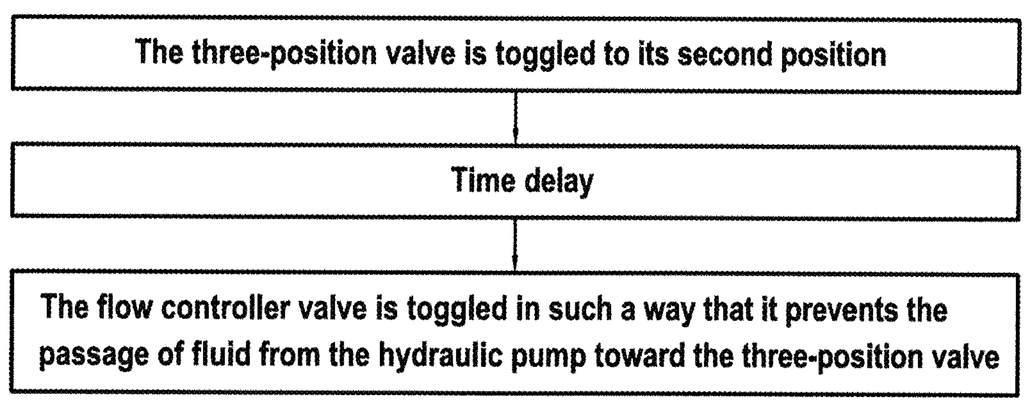
FIG. 4 is a flow diagram illustrating disengagement of the drive assistance by the vehicle drive assistance system.

FIGS. 3 and 4 are flow diagrams illustrating shutoff of the control of the three-position valve, and disengagement of the drive assistance by the vehicle drive assistance system discussed in detail below.

These figures show a motor M driving a hydraulic machine 10 here providing a hydraulic pump function. It will thus be denoted in the remainder of the text as the hydraulic pump 10. The motor M is typically a heat engine, or any other type of motor providing the driving of an axle of a vehicle, for example a truck or a piece of agricultural, lifting and handling or building site machinery.

The hydraulic pump 10 is a variable-displacement hydraulic pump, and is adapted in such a way as to automatically regulate its displacement to maintain a pressure at the outlet of the hydraulic pump 10. Such a pump is commonly referred to as load-sensing. Such hydraulic pumps typically have a single direction of flow for open-circuit drives, and thus need to be combined with directional valves to supply members, and/or to direction-reversing directional valves to supply members, the drive direction of which can be reversed. The operation of such a hydraulic pump 10 is well-known, as are the elements providing the function of regulating the displacement of the hydraulic pump 10. Such a hydraulic pump 10 is thus pressure-controlled. It comprises an internal device modulating its displacement in such a way as to reach the pressure setpoint at its outlet, the displacement control being for example embodied by means of a feedback loop. The hydraulic pump 10 thus modulates its displacement; it increases it when the outlet pressure is less than the pressure setpoint, and reduces it when the outlet pressure is greater than the pressure setpoint. Such hydraulic pumps can typically reach zero displacement, and a maximum displacement of up to 600 bar. Such hydraulic pumps usually have a minimum setpoint, for example between 20 and 30 bar. They may be configured in such a way as to apply this minimum setpoint in the absence of any specific setpoint. The minimum setpoint can typically be embodied by the mechanical configuration of the pump displacement control, and is applicable in the absence of any signal being received by the pump. The pressure setpoint can be a fixed or variable setpoint. The hydraulic circuit associated with such a hydraulic pump 10 is a hydraulic circuit of open type.

The hydraulic pump 10 draws a fluid, typically oil, into a reservoir R, and delivers a flow of fluid into an open hydraulic circuit, in such a way as to selectively power one or more hydraulic motors 20, here two hydraulic motors 20A and 20B which can each rotationally drive a vehicle wheel. The hydraulic motors each have a casing connected to the reservoir R. In the illustrated example, a flow divider 50, the structure of which is well-known to those skilled in the art, distributes the flow between the two hydraulic motors 20A and 20B.

Although these figures have a circuit structure with two hydraulic motors, will be understood that this summary relates to a circuit having any number of hydraulic motors. In the remainder of the text reference will be made to the hydraulic motor 20, denoting the hydraulic motors of the hydraulic circuit, where applicable associated with a flow distributor or to a flow divider.

The hydraulic motors 20 are typically hydraulic motors with radial pistons and multilobe cam, the structure of which is well-known to those skilled in the art.

In general, the following are defined in the hydraulic circuit:

- an intake duct, connecting the reservoir R to the hydraulic pump 10,
- a supply duct connecting the hydraulic pump 10 to the hydraulic motor 20, and
- a return duct, connecting the hydraulic motor 20 to the reservoir R.

The connection between the hydraulic pump 10 and the hydraulic motors 20 is embodied by means of a three-position valve 30 with an open center, which is positioned in the supply duct.

The three-position valve 30 has five orifices:

- a first orifice 31 connected to the hydraulic pump 10,
- a second orifice 32 connected to the reservoir R,
- a third orifice 33 connected to a first orifice 21 of the hydraulic motor 20,
- a fourth orifice 34 connected to the reservoir R, and
- a fifth orifice 35 connected to a second orifice 22 of the hydraulic motor 20.

In the illustrated example, the casings of the hydraulic motors 20 are connected to the reservoir R via a duct common to the one connecting the fourth orifice 34 of the three-position valve 30 to the reservoir R. It will however be understood that this embodiment is not limiting; the casings of the hydraulic motors 20 on the one hand and the fourth orifice 34 of the three-position valve 30 on the other can be connected to the reservoir R via separate ducts. More particularly, the fourth orifice 34 of the three-position valve 30 can be connected directly to the reservoir R, independently of the casings of the hydraulic motors 20.

In a first position, the first orifice 31 is connected to the third orifice 33, the second orifice 32 is connected to the fifth orifice, and the fourth orifice 34 is blanked off. This first position thus connects the hydraulic pump 10 to the hydraulic motor 20, and thus makes it possible to drive the hydraulic motor 20 in a first direction of operation.

In a second position, the first orifice 31 is connected to the second orifice 32, the third orifice 33, the fourth orifice 34 and the fifth orifice 35 are connected. This position corresponds to an operation in freewheel of the hydraulic motor 20, whose two orifices 21 and 22, i.e. the intake and the discharge, are connected to the reservoir R.

In a third position, the first orifice 31 is connected to the fifth orifice 35, the second orifice 32 is connected to the third orifice 33, and the fourth orifice is blanked off. This third position thus connects the hydraulic pump 10 to the hydraulic motor 20, and thus makes it possible to drive the hydraulic motor 20 in a second direction of operation, reversed with respect to the first direction of operation obtained using the first position.

The three-position valve 30 is controlled via the controls 36 and 37 coupled to return means 38 and 39. The controls 36 and 37 are typically pneumatic or electrical controls. The return means 38 and 39 are typically elastic return means such as springs. The three-position valve 30 is typically by default (i.e. in the absence of any control being applied) in the second position, and the enabling of the controls 36 or 37 makes it possible to toggle it to the first position or to the third position.

The operation of the three-position valve 30 is known. When the hydraulic assistance is used, the three-position valve 30 toggles to its first position or to its third position (via the controls 36 or 37) in order to supply the hydraulic motors 20. When the hydraulic assistance is not used, the three-position valve 30 returns to its second position, and the hydraulic motors 20 are then connected to the reservoir R, so to an ambient pressure.

As already indicated in the introduction of this summary, a problem resulting from the use of the open-center three-position valve 30 is that when the three-position valve 30 is in its second position, the hydraulic pump 10 delivers a flow into the reservoir R. The hydraulic pump 10, which is a variable-displacement hydraulic pump, one way, with displacement control slaved to a pressure setpoint, will try to reach its pressure setpoint, typically its minimum pressure setpoint, for example between 20 and 30 bar, and therefore automatically increase its displacement by attempting to set up a pressure in the reservoir R, and will thus flow at full displacement, which then causes a pointless expenditure of energy in the system.

In order to prevent such an increase in the displacement of the hydraulic pump 10 when the three-position valve 30 is in its second position, the assistance system comprises a flow controller 40 positioned between the hydraulic pump 10 and the first orifice 31 of the three-position valve 30.

In the illustrated example, the flow controller 40 is a two-way, two-position valve, usually closed, having a first orifice 41 connected to the hydraulic pump 10, and a second orifice 42 connected to the first orifice 31 of the three-position valve 30. The flow controller 40 is here controlled by a control 43, typically pneumatic or electrical, to which is opposed a return element 44, typically an elastic return means such as a spring. The flow controller 40 here alternates between two positions: a first position, which it takes up as default, wherein it prevents the passage of fluid from its second orifice 42 toward its first orifice 41, and a second position wherein it is through, i.e. the fluid can pass freely between its first orifice 41 and its second orifice 42. The flow controller 40 can also be a four-way, two-position channel valve, usually closed. The term "usually closed" here denotes a valve which in its default configuration is closed, i.e. it does not allow the passage of fluid.

In the illustrated example, the flow controller 40 is an on-off valve; i.e. it toggles between the first position wherein it blocks the passage of fluid from the hydraulic pump 10 toward the three-position valve 30 and the second position wherein it allows the passage of fluid with a maximum flow rate between the hydraulic pump 10 and the three-position valve 30.

In a variant, the flow controller 40 is a proportional distributor. Such a variant makes it possible to avoid the generation of pressure peaks in the hydraulic circuit when the flow controller 40 goes from its first position to its second position.

The flow controller 40 is typically controlled in such a way as to toggle to its second position when the hydraulic assistance is used, and therefore typically when the three-position valve 30 toggles to its first position or to its third position, or after the execution of a time delay following the toggling of the three-position valve 30 to its first position or to its third position.

When one wishes to disengage the hydraulic assistance, the flow controller 40 is typically controlled in such a way as to bring it to its first position. The supply of fluid of the hydraulic motor 20 is then cut off. The pressure at the intake and at the discharge of the hydraulic motor 20 then drops, while the pressure in the casing of the hydraulic motor 20 increases, which causes the freewheeling of the hydraulic motor 20 by the retraction of the pistons into their housings. The three-position valve 30 is then typically brought to its second position.

The flow controller 40 and the three-position valve 30 are typically controlled by means of a controller, for example an electronic control unit or ECU according to the acronym commonly used.

The system for which provision is made also comprises a choke 60 (also referred to as a flow limiter or nozzle) connecting two return ducts. More precisely, the system comprises a choke 60 a first return duct connecting the second orifice 32 of the three-position valve 30 to the reservoir R, and a second return duct connecting the casings of the hydraulic motors 20 to the reservoir R. These two return ducts are equipped with tared check valves, respectively 64 and 62. It will be understood that the invention is not strictly limited to such components; the system can have equivalent means performing the functions of the choke 60 and of the tared check valves 64 and 62.

As indicated previously FIG. 1 shows the system in idle configuration or in disengaged configuration, while FIG. 2 shows the system in operation, i.e. when the hydraulic assistance is in operation.

With reference to FIG. 2, it can be seen here that the hydraulic pump 10 is supplying the hydraulic motors 20; the flow controller 40 is through, the three-position valve 30 also. Note that a similar operation but in the reverse direction can be obtained with the three-position valve 30 in its third configuration as previously described.

During the disengagement of the hydraulic assistance, firstly the control of the three-position valve 30 is shut off; the latter therefore toggles to its default configuration as described previously. The flow delivered by the hydraulic pump 10 is then directed toward the reservoir R. However, the presence of the tared check valve 64 and of the choke 60 will cause the deviation of a part of the flow toward the second return duct, and will therefore cause an increase in pressure in the casings of the hydraulic motors 20, which contributes to the retraction of the pistons of the hydraulic motors 20 into their housings, and therefore the setting of the hydraulic motors 20 to zero displacement. The excess flow is directed to the reservoir R via the tared check valve 62. The tared check valves 64 and 62 are typically configured in such a way as to be through in only one direction (in the direction of the reservoir R) when the pressure which is applied to them is greater than a threshold value, respectively P64 and P62. These pressure threshold values P64 and P62 are typically such that P64>P62. By way of example, P64 can be equal to 3 bar, while P51 can be equal to 1.5 bar. The tared valves 62 and 64 may be replaced by other means making it possible to reach these pressures, for example chokes or diaphragms, or a length of duct of reduced cross-section, which makes it possible to obtain these standard flow pressures of the duct under these usage conditions. To avoid the flow reaching the supply of the hydraulic motors 20, the duct connecting the fourth orifice 34 of the three-position valve 30 to the reservoir R is typically separated from the duct connecting the casings of the hydraulic motors 20 to the reservoir R, or is provided with a check valve which allows the passage of the fluid only in the direction going from the fourth orifice 34 of the three-position valve 30 toward the reservoir R.

Next, the flow controller 40 is disengaged; it toggles to its default configuration (as shown in FIG. 1), wherein it is not through. The hydraulic pump 10 then reduces its displacement which will tend to 0 or be null. Specifically, the orifice 41 at the outlet of the hydraulic pump 10 being blanked off, the pressure at the outlet of the hydraulic pump 10 will increase until it reaches the setpoint value of the hydraulic pump 10, which can be its minimum setpoint, for example 20 or 30 bar. This latter will then modulate its displacement to reduce it until it tends to zero or is null, insofar as the setpoint pressure at the outlet of the hydraulic pump 10 is then reached. The system is then in an idle configuration. A time delay is typically provided between the shutoff of the control of the three-position valve 30 and the shutoff of the control of the flow controller 40, in order to ensure the retraction of the pistons of the hydraulic motors 20 into their housings.

For vehicles where the hydraulic pump 10 is a pump dedicated to hydraulic accessories for temporary use, such as a loading crane, a clutch can be disposed between the heat engine M and the hydraulic pump 10, typically placed on a power connector of PTO type of the engine M (typically a heat engine). The engaging step can be preceded by clutching the hydraulic pump 10 onto the power connector of the engine M, which sets it in rotation. The valve 40 advantageously makes it possible to keep the hydraulic pump 10 in a reduced-capacity sleep mode, which creates a power-saving standby mode. The disengaging step can be followed by a step of declutching the hydraulic pump 10. However, provision can be made for a long period of use of the hydraulic pump 10, and for keeping it in sleep mode, between two requests for assistance. In this standby mode, the disengaged state is maintained which makes it possible to limit the wear of the clutch, and to keep the hydraulic pump 10 in a reduced-capacity sleep mode, in a power-saving standby mode.

The system for which provision is made thus makes it possible to combine the advantages of an open-center valve and a closed-center valve, while dispensing with their drawbacks. The flow controller specifically makes it possible to control the displacement of the hydraulic pump 10 to produce an increase in displacement when the hydraulic assistance is used, or a decrease in displacement when the hydraulic assistance is not engaged. The system for which provision is made thus makes it possible to minimize, or even to eliminate the power consumption by the hydraulic pump 10 when the hydraulic assistance is disengaged owing to the addition of the closed-center flow controller 40, while benefiting from the function of the open-center three-position valve 30, particularly to allow the disengagement of the hydraulic motors 20 when the hydraulic assistance is disengaged, and to make it possible to allow an increase in the displacement of the hydraulic motors 20 when the hydraulic assistance is used.

Although this invention has been described with reference to specific exemplary embodiments, it is obvious that modifications and changes can be made to these examples without departing from the general scope of the invention as defined by the claims. In particular, individual features of the different embodiments illustrated/mentioned may be combined in additional embodiments. Consequently, the description and drawings must be considered in an illustrative rather than a restrictive sense.

It is also obvious that all the features described with reference to a method are transposable, alone or in combination, to a device, and conversely, all the features described with reference to a device are transposable, alone or in combination, to a method.

The invention claimed is:

1. A vehicle drive assistance system comprising an open hydraulic circuit comprising a hydraulic pump, a hydraulic motor and a reservoir, the hydraulic circuit comprising an intake duct connecting the reservoir to the hydraulic pump, a supply duct connecting the hydraulic pump to the hydraulic motor, and a return duct connecting the hydraulic motor to the reservoir, said vehicle drive assistance system further comprising a three-position valve connected to the supply duct and to the return duct, configured to, in a first position supplying the hydraulic motor in a first direction of operation, in a second position fluidly isolating the hydraulic motor from the hydraulic pump and connecting the hydraulic motor to the reservoir, and in a third position supplying the hydraulic motor in a second direction of operation opposite to the first direction of operation, wherein the hydraulic pump is a variable-displacement hydraulic pump, unidirectional, with displacement control slaved to a pressure setpoint;

the vehicle drive assistance system comprises a flow controller valve positioned on the supply duct, between the hydraulic pump and the three-position valve, said flow controller valve being configured to, in a first configuration, prevent the passage of fluid through the supply duct of the hydraulic pump toward the three-position valve so that the displacement of the hydraulic pump is zero or is neutral, and in a second configuration, allowing the passage of fluid through the supply duct of the hydraulic pump toward the three-position valve, and wherein the three-position valve has:

a first orifice connected to the hydraulic pump via the flow controller valve, a second orifice connected to the reservoir, a third orifice connected to a first orifice of the hydraulic motor, a fourth orifice connected to the reservoir, and a fifth orifice connected to a second orifice of the hydraulic motor, and wherein the second position connects the first orifice to the second orifice, and connects the third orifice to the fourth orifice and to the fifth orifice.

2. The vehicle drive assistance system as claimed in claim 1, wherein the flow controller valve is a two-position valve, having a first position wherein the flow controller valve allows the passage of fluid, and a second position wherein the flow controller valve prevents the passage of fluid from the hydraulic pump toward the three-position valve.

3. A method for controlling the vehicle drive assistance system as claimed in claim 2, wherein a first step is the three-position valve is toggled to the second position of the three position valve, then a second step performed after the first step is the flow controller valve is toggled in such a way that the flow controller valve prevents the passage of fluid from the hydraulic pump toward the three-position valve thereby disengaging-the drive assistance by the vehicle drive assistance system.

4. The vehicle drive assistance system as claimed in claim 1, wherein the flow controller valve is a proportional valve.

5. A method for controlling the vehicle drive assistance system as claimed in claim 4, wherein a first step is the three-position valve is toggled to the second position of the three-position valve, then a second step performed after the first step is the flow controller valve is toggled in such a way that the flow controller valve prevents the passage of fluid from the hydraulic pump toward the three-position valve thereby disengaging drive assistance by the vehicle drive system.

6. The vehicle drive assistance system as claimed in claim 1, wherein the flow controller valve is configured to allow fluid to pass through the flow controller valve when the three-position valve is positioned in a first position or in a third position of said three-position valve.

7. A method for controlling a vehicle drive assistance system as claimed in claim 6, wherein a first step is the three-position valve is toggled to the second position, then a second step performed after the first step is the flow controller valve is toggled in such a way that the flow passage valve prevents the passage of fluid from the hydraulic pump toward the three-position valve thereby disengaging drive assistance by the vehicle drive assistance system.

8. The vehicle drive assistance system as claimed in claim 1, wherein the hydraulic motor is a hydraulic motor with radial pistons and multi-lobe cam.

9. The vehicle drive assistance system as claimed in claim 8, wherein the pistons of the hydraulic motor can be retracted into housings, in such a way as to reduce or eliminate the displacement of said hydraulic motor.

10. A method for controlling the vehicle drive assistance system as claimed in claim 8, wherein a first step is the three-position valve is toggled to the second position of the three position valve, then a second step performed after the first step is the flow controller valve is toggled in such a way that the flow controller valve prevents the passage of fluid from the hydraulic pump toward the three-position valve thereby disengaging the drive assistance by the vehicle drive assistance system.

11. The vehicle drive assistance system as claimed in claim 1, wherein the second orifice of the three-position valve is connected to the reservoir via a first return duct, a casing of the hydraulic motor is connected to the reservoir via a second return duct, said return ducts being equipped with check valves set to open respectively at set pressures P64 and P62 such that P64>P62, the first return duct and the second return duct being connected by a choke upstream of said check valves.

12. The vehicle drive assistance system as claimed in claim 1, said vehicle drive assistance system comprising a controller adapted to control the flow controller and the three-position valve, said controller being configured in such a way as to provide a time delay between a shutoff of the control of the three-position valve and a shutoff of the control of the flow controller valve.

13. A method for controlling a vehicle drive assistance system as claimed in claim 1, wherein a first step is the three-position valve is toggled to the second position of the three-position valve, then a second step is performed after the first step wherein the flow controller valve is toggled in such a way that it prevents the passage of fluid from the hydraulic pump toward the three-position valve thereby disengaging drive assistance by the vehicle drive assistance system.

* * * * *